United States Patent

[11] 3,607,193

| | | | |
|---|---|---|---|
| [72] | Inventors | Robert Bourggraff<br>Koln;<br>Franz Classen, Porz-Grengel, both of Germany | |
| [21] | Appl. No. | 729,635 | |
| [22] | Filed | May 16, 1968 | |
| [45] | Patented | Sept. 21, 1971 | |
| [73] | Assignee | Erste Deutsche Floatglas GmbH & Co.<br>Cologne, Germany | |
| [32] | Priority | May 16, 1967 | |
| [33] | | Germany | |
| [31] | | E 33991 Vib/32a | |

[54] FLOAT GLASS APPARATUS WITH HEAT EXCHANGE CONTROL
3 Claims, 2 Drawing Figs.

[52] U.S. Cl. .................................................. 65/160,
65/99 A, 65/162, 65/164, 65/182 R

[51] Int. Cl. .............................................. C03b 18/02
[50] Field of Search .................................. 65/99, 182,
160, 161, 162, 164

[56] References Cited
UNITED STATES PATENTS

| | | | |
|---|---|---|---|
| 3,352,657 | 11/1967 | Charnock ..................... | 65/99 X |
| 3,482,954 | 12/1969 | Yuen ............................ | 65/99 |

*Primary Examiner*—S. Leon Bashore
*Assistant Examiner*—J. B. Hardaway
*Attorney*—Wilson & Fraser ABSTRACT: The specification describes a float glass production plant in which, in order to prevent breakages, variations in the rate of feed of molten glass onto a metal bath are arranged to bring about variations in heating of the glass near the position at which it leaves the bath.

FLOAT GLASS APPARATUS WITH HEAT EXCHANGE CONTROL

The present invention relates to the production of flat glass strips by floating molten glass on a bath of molten metal. In such methods the glass is generally placed at a controlled rate on a bath of tin or other metal, is caused to move along the bath while subjected to controlled cooling in order to regulate its temperature and is removed at the downstream end of the bath by means of mechanical conveying devices such as conveyor rollers.

The regulation of the temperature of the glass strip or plate along the tin bath is generally carried out by means of electrical heating elements which are arranged above or in the tin bath. Temperature regulation can also be carried out by cooling elements as well as heating elements. The temperature regulation is designed to ensure that there is a controlled cooling of the glass strip so as to make possible the achievement at the upstream end of the bath of an even thickness of glass strip. The glass then gradually cools as it moves along the bath until it reaches a plastic condition and is finally so solidified by further cooling that it can be drawn off the tin bath without damage, with a fire-polished surface.

In practice there is the difficulty that breakage of the glass strip occurs at the position at which it leaves the bath or immediately afterwards. The danger of breakage is apparently made particularly great by the fact that the temperature of the glass strip must be held as low as possible at this position in order to avoid damage to the glass surface and because, on the other hand, the glass strip is suddenly subjected to high thermal and mechanical loads. However a breakage of the glass strip at this position entails at least a complete rupture in production and concomitant costly and serious consequences.

We have now observed that the danger of breakage of the glass strip as it leaves the tin bath container is much higher at some times than others.

One object of the present invention is to prevent such breakages in the production of glass.

A further object of the invention is to improve the known method of producing glass by floating on metal in such a manner that the danger of breakage of the glass strip is reduced.

The present invention consists in a method for producing a strip of glass of indefinite length, comprising pouring molten glass onto a bath of molten metal, causing the glass to travel along the surface of the metal in the form of a strip to a downstream end of the bath, removing the glass as a solid strip, and regulating the temperature of the glass on the bath in accordance with the rate of supply of glass onto the bath.

It has been found that the propensity of the glass strip to break at certain times is to be attributed to a reduction in the temperature of the glass strip which in turn is due to a variation in the rate at which the glass is supplied to the tin bath. Variations in the rate of supply are, however, frequently necessary in order to overcome difficulties or interruptions in the operation of the manufacturing plant. A reduction in the rate of supply of the glass, more particularly, is found to lead to a substantial increase in the danger of breakage. This can be seen to be something that is to be expected if one takes into account the fact that the glass is passed onto the tin bath in the tin container at a temperature of about 1,100° C. and leaves it with a temperature of about 600° C. A reduction in the rate of supply of the bath therefore leads to a reduction of the amount of heat supplied to the tin bath which, eventually, leads to a reduction in the glass bath temperature.

Although it is known that the temperature of the glass strip at the end of the tin bath can be regulated by means of heating and/or cooling elements controlled by the heat radiated by the glass, this method of heat regulation has substantial disadvantages: on the one hand it is difficult to measure extremely small variations in temperature which may be critical for an increase in the danger of the glass breaking, so that the signal for raising the temperature may only be given when the glass temperature has already run below the lowest permitted value, and on the other hand one has to consider that the measurements within the tin bath container are considerably influenced by external factors. Also the effect of the regulating means, that is to say the heating or cooling of the glass strip, may only come into play after a substantial delay with the result that it may be too late to prevent a breakage of the glass strip.

In practice the rate of supply of the glass melt is generally regulated by a vertically adjustable sluice dipping into the glass melt. The height of the sluice is normally subject to continuous variation, corresponding to variations of 1 to 2 percent in the cross section of the sluice passage in order to take into account variations in the manufacturing process as a whole which would otherwise upset the equilibrium of the whole process. Such small alterations in the setting of the sluice, which are primarily intended to maintain the rate of supply of the glass to the bath constant despite any change in viscosity of the glass, do not increase the danger of breakage.

However, if the alterations in the position of the sluice exceed this usual amount of variation, that is to say 1 to 2 percent, the equilibrium of the manufacturing process is disturbed and this leads to variations in the temperature of the glass strip at the downstream or outlet end of the tin bath.

In accordance with a preferred feature of the invention, in which the rate of supply of molten glass is controlled by a vertically adjustable sluice dipping into the glass melt, the action of heating and cooling elements is controlled in accordance with the position of the regulating sluice.

While it is of course naturally possible to provide heating elements along the whole length of the tin bath for regulating the heat in accordance with the rate of supply of molten glass in accordance with the invention, it is possible in many cases only to control the supply of heating energy to heating elements at the end of the tin bath for putting the invention into effect. As a result the aim of the invention, that is to say holding the temperature of the glass strip at the downstream end constant of the bath is fully achieved.

The greater the distance of the controlled heating elements from the position at which glass is supplied to the bath, the longer the time taken for a variation in the rate of supply of glass to the upstream end of the bath to have any effect on conditions at the downstream end of the bath. In order to compensate for this time lag, the control of the supply of energy to the heating elements is preferably carried out with a corresponding time delay.

In accordance with an advantageous further development of this principle, the size of the time delay is automatically controlled in accordance with the speed of the glass strip. The greater the speed of the glass strip the less must be the time delay between an alteration in the rate of glass supply and the correspondingly brought about alteration in the supply of energy to the heating elements.

The present invention also consists in an apparatus for producing strip glass comprising a container, molten metal in the container, a sluice for controlling the flow of glass onto the metal in the container as an upstream end of the container, means for removing glass as a substantially solidified strip from a downstream end of the bath of molten metal, means for moving the sluice vertically for controlling the flow of molten glass onto the bath, means for controlling the temperature of the glass on the bath, and means for controlling the temperature-controlling means in accordance with the rate of supply of glass to the metal bath.

Preferably, the means for controlling the temperature-controlling means is responsive to the position of the sluice. Preferably, also, in temperature-controlling means in question are placed at the downstream end of the bath. A delay means can be used to cause a delay in a signal corresponding to the time taken for glass to travel from the upstream to the downstream end of the metal bath. These means can be arranged to be automatically responsive to the speed of the glass along the bath surface.

The invention is now further described of reference to the accompanying drawings.

Figure 1:
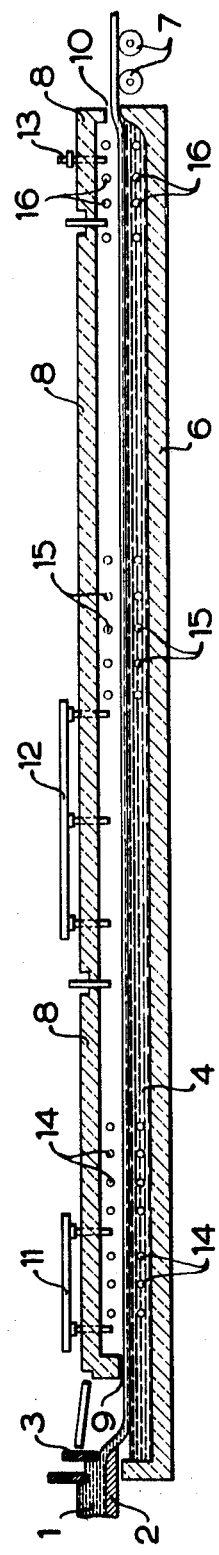
FIG. 1 is a section to an apparatus in accordance with the invention for the production of flat glass.

Referring to the drawings and more particularly to FIG. 1 it will be seen that molten glass 1 flows over a fixed bottom plate or threshold 2 under sluice or slide 3 which is adjustable as to height. The molten glass flows onto a bath 4 of molten tin. On the tin bath 4 it forms the glass strip 5 which is drawn over the bath means of transport rollers 7 arranged downstream from the tin bath container 6. The latter is covered by a roof construction 8 which protects it from the outside atmosphere. The main openings providing access to the inside of the container over the bath are the inlet opening 9 for the molten glass and the glass outlet opening 10.

The supply ducts 11, 12, and 13 serve for the entry of protective gas under a pressure which is slightly above atmospheric into the space above the tin bath in order to prevent in this manner oxidation of the tin.

Along the container 6 there are heating elements, shown diagrammatically by reference numerals 14, 15, and 16, which are arranged above the surface of the bath and below it. The heating elements can be in the form of electrical resistance heating means or induction heating means. The heating elements serve to cause the temperature of the bath to follow a specific characteristic along its length.

For the outlet temperature of the glass strip leaving the tin bath container the temperature characteristic of the glass band in the upstream part of the tin bath container is generally not critical. The outlet temperature can be determined by the heating elements 16 at the end of the bath. For this reason, only the heating elements 16 are controlled in accordance with the position of the regulating sluice 3.

The regulating sluice 3 is carried on screw-threaded spindles which are not shown and can be operated by hand or by an electric motor in order to produce a fine adjustment of the sluice passage for the molten glass.

Figure 2:
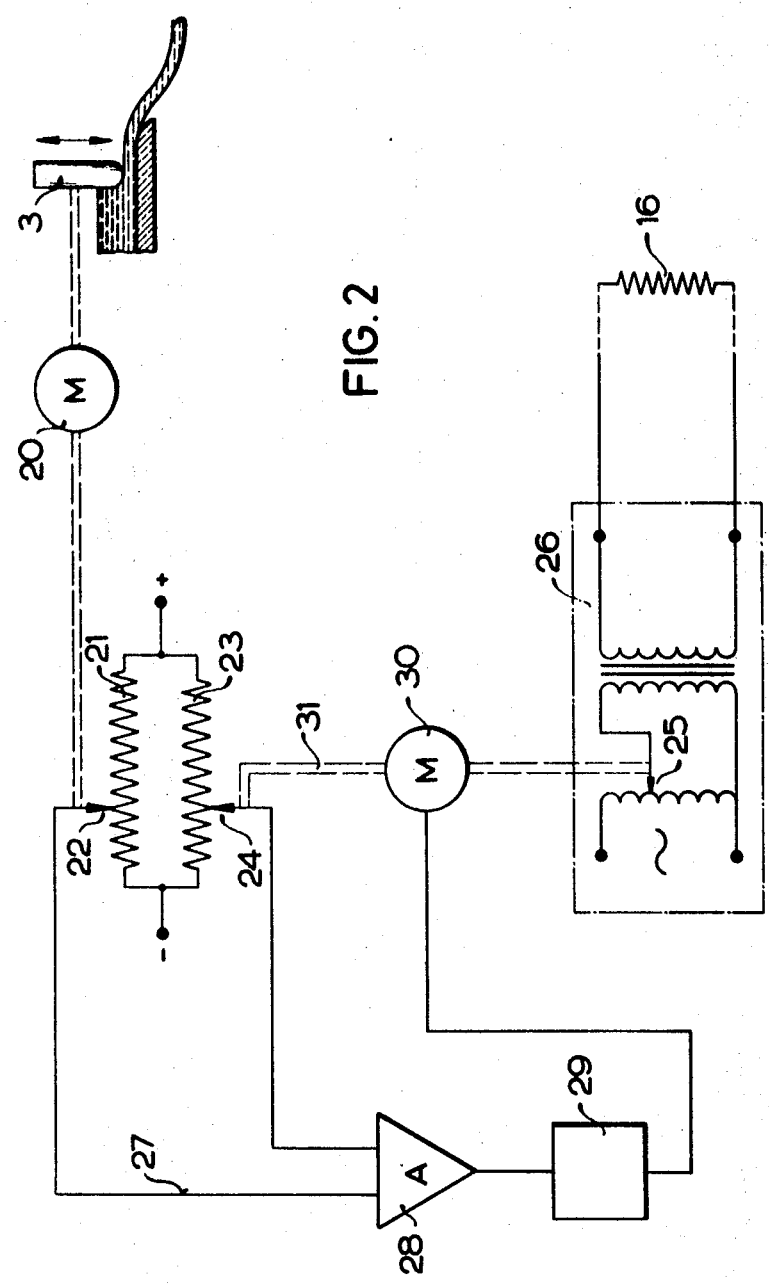
FIG. 2 shows an electrical circuit for controlling the apparatus.

The position of the sluice 3 and the regulating means for the supply of heating current to the heating elements 16 are so coupled together that with a reduction, for example, of the sluice opening of 4 percent the supply of current to the heating elements 16 is increased by an amount equal to about 10 percent of a selected datum value while with decreases in the sluice passage of 10 and 20 percent there are increases in the current equal to respectively 30 and 50 percent of the datum value. These values are only given by way of rough guidance and can be varied considerably, the selection of the correct relationship being a matter of simple tests. This is shown in an embodiment of a possible electrical control system for the apparatus shown in FIG. 1 see in FIG. 2. The manner of functioning is as follows.

The setting motor 20 for the regulating sluice 3 is provided with a transmitter 21 in the form of a potentiometer which together with a further transmitter 23 in the form of a potentiometer, driven by the motor 30 forms two limbs of a bridge circuit. The motor 30 is responsible for moving the contact arm 25 of a heating transformer unit 26 for supplying the heating elements 16. A movement of the regulating sluice causes a displacement of the slide 22 of the potentiometer 21 so that there is a corresponding change in the potential between the slide 22 and a further slide 24 of the potentiometer 23. The potential between the slides 22 and 24 is conducted by leads, one of which is denoted by reference numeral 27, to an amplifier 28 whose output is delayed by delay unit 29 before it acts on the setting motor 30 for the heating transformer 26. The motor 30 continues to be driven moving both the arm 25 and, via the part 31, slide 24 until the bridge circuit is in balance. The time delay unit 29 has the function of delaying the adjustment of the heating transformer until the change in the rate of glass supply has been reached at the downstream end of the bath, that is to say the delay is equal to the time taken for the glass to travel from one end of the bath to the other. The size of the delay is automatically set in accordance with the speed of the glass strip on the tin bath.

What we claim is:

1. An apparatus for producing float glass comprising:
a container having an inlet and outlet;
molten metal in said container;
an adjustable sluice for regulating the amount of glass flowing onto said molten metal in said container at the inlet of said container;
means for regulating said sluice thereby regulating the amount of glass flowing onto said molten metal;
means positioned within said container for regulating the heat exchange of said molten metal in proportion to the rate of supply of glass passed onto the molten metal; and
control means connected to said means for regulating said sluice and to said means for regulating the heat exchange such that when a greater amount of glass is passed onto said molten metal less heat is exchanged to said molten metal and when a lesser amount of glass is passed onto said molten metal more heat is exchanged to said molten metal.

2. An apparatus in accordance with claim 1 wherein said means for regulating the heat exchange on the bath is disposed at the outlet end of the container.

3. An apparatus in accordance with claim 1 including a time delay means for delaying the regulation of heat exchange on the molten metal in proportion to the speed of travel of the glass on the other metal.